United States Patent [19]

Seilly et al.

[11] 4,426,983

[45] Jan. 24, 1984

[54] LIQUID FUEL PUMPING APPARATUS

[75] Inventors: Alec H. Seilly, North Wembley; Andrew E. Murray, London, both of England

[73] Assignee: Lucas Industries Limited, Birmingham, England

[21] Appl. No.: 304,932

[22] Filed: Sep. 23, 1981

[30] Foreign Application Priority Data

Oct. 4, 1980 [GB] United Kingdom ............... 8032064
Dec. 23, 1980 [GB] United Kingdom ............... 8041280
Mar. 28, 1981 [GB] United Kingdom ............... 8109788

[51] Int. Cl.³ ......................................... F02M 39/00
[52] U.S. Cl. ................................. 123/506; 123/450; 123/198 D; 123/494; 123/479; 417/462
[58] Field of Search ............... 123/494, 450, 451, 458, 123/357, 358, 359, 479, 387, 198 D, 506; 417/462, 252, 253, 294

[56] References Cited

U.S. PATENT DOCUMENTS

| | | | |
|---|---|---|---|
| 3,598,507 | 8/1971 | Voit | 123/450 |
| 3,661,130 | 5/1972 | Eheim | 123/359 |
| 3,827,409 | 8/1974 | O'Neill | 123/458 |
| 3,896,779 | 7/1975 | Omori | 123/449 |
| 4,200,075 | 4/1980 | Takahashi | 123/387 |
| 4,292,012 | 9/1981 | Brotherston | 123/450 |
| 4,351,283 | 9/1982 | Ament | 123/506 |

*Primary Examiner*—Charles J. Myhre
*Assistant Examiner*—Carl Stuart Miller

[57] ABSTRACT

A liquid fuel pumping apparatus for supplying fuel to a multi-cylinder engine has a plurality of outlets for connection to the injection nozzles of the engine. The apparatus includes a spill passage and a spill control valve which is electrically controlled. The valve is closed to cause fuel from a high pressure pump to be delivered through the outlets, fuel being supplied by the high pressure pump to the outlets in turn. A pressure transducer provides signals indicative of the pressures attained in the various outlets during delivery of fuel therethrough. One of the pressure signals serves as a standard and the other signals are compared with this signal to produce correction signals which vary the time the spill valve is closed when fuel is supplied to those outlets to which the other signals pertain.

5 Claims, 9 Drawing Figures

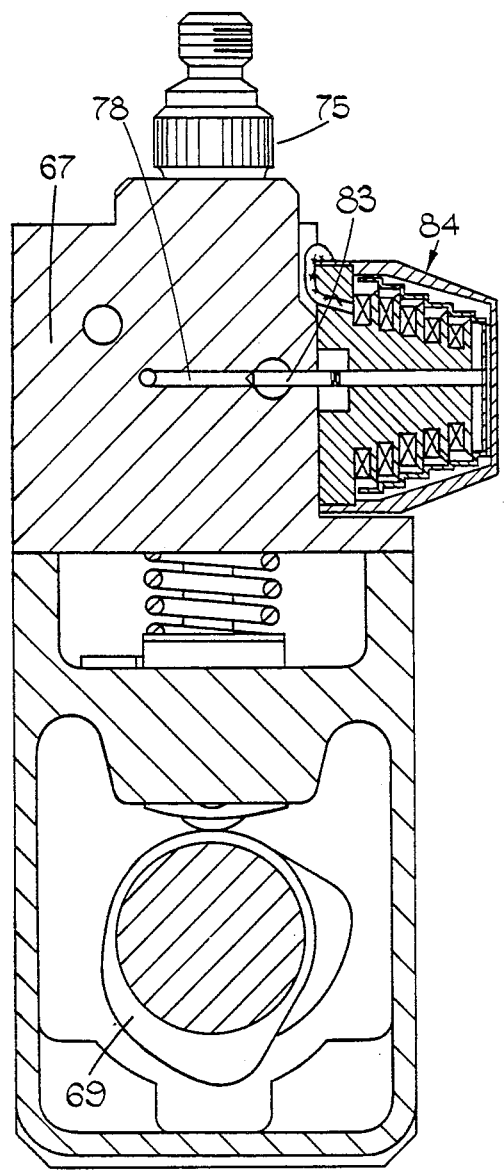
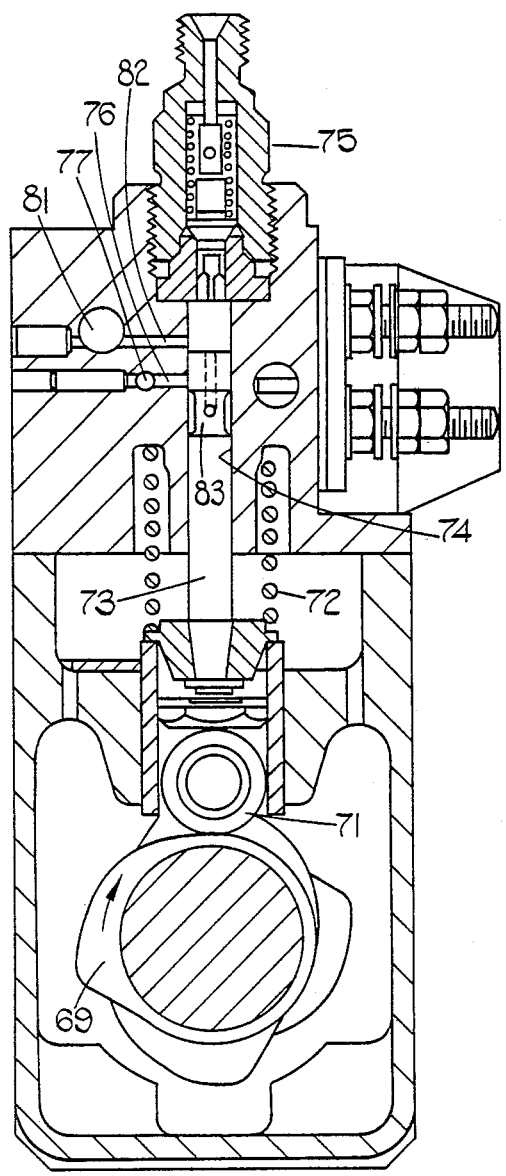
FIG.6.
FIG.7.

LIQUID FUEL PUMPING APPARATUS

This invention relates to liquid fuel injection pumping apparatus for supplying fuel to the injection nozzles in turn of a multi cylinder compression ignition engine and of the kind comprising a plurality of outlets for connection in use to the fuel injection nozzles respectively and means for delivering fuel to the outlets in turn.

Such apparatus is well known in the art and can have several forms. One such form is where the aforesaid means comprises a single injection pump which through the agency of a rotary valve delivers fuel to the outlets in turn and in timed relationship with the engine. This form of pump is known in the art as a rotary distributor pump. Another form of apparatus is where the aforesaid means comprises a number of injection pumps equal in number to the number of engine cylinders and which are operated in timed relationship with the associated engine to deliver fuel to the respective outlets. This form of pump is known in the art as an in-line pump.

During the manufacture of both forms of apparatus great care is taken to ensure that for a given setting of a fuel control member of the apparatus, the same amount of fuel will flow through each outlet.

When the apparatus is in use it is found that each combustion space of the associated engine may not receive the same amount of fuel. This is thought to be due to slight differences in the operating characteristics of the injection nozzles. It is necessary with the advent of strict exhaust emission laws and the need to conserve fuel, to ensure that each combustion space receives the same amount of fuel. Careful setting of the spring loadings of the valves of the injection nozzles does not always achieve the desired result and there is always the problem that in use one or more of the nozzles may deteriorate more quickly than the remaining nozzles.

The object of the invention is to provide an apparatus of the kind specified in an improved form.

According to the invention, an apparatus of the kind specified comprises a spill passage which in use is connected to the outlets in turn when said outlets are supplied with fuel, an electrically controlled valve in said spill passage, said valve when open diverting fuel from the outlet with which it is connected, electrical circuit means for controlling the operation of said valve, a pressure transducer responsive to the pressure upstream of said valve, said pressure transducer supplying signals to said circuit means indicative of the fuel pressures attained during delivery of fuel through the outlets, said circuit means including means responsive to said signals for adjusting the periods during which the valve is closed.

Examples of a fuel pumping apparatus in accordance with the invention will now be described with reference to the accompanying drawings in which:

FIGS. 6 and 7 show sectional side elevations of the apparatus seen in FIG. 5;

Figure 1:
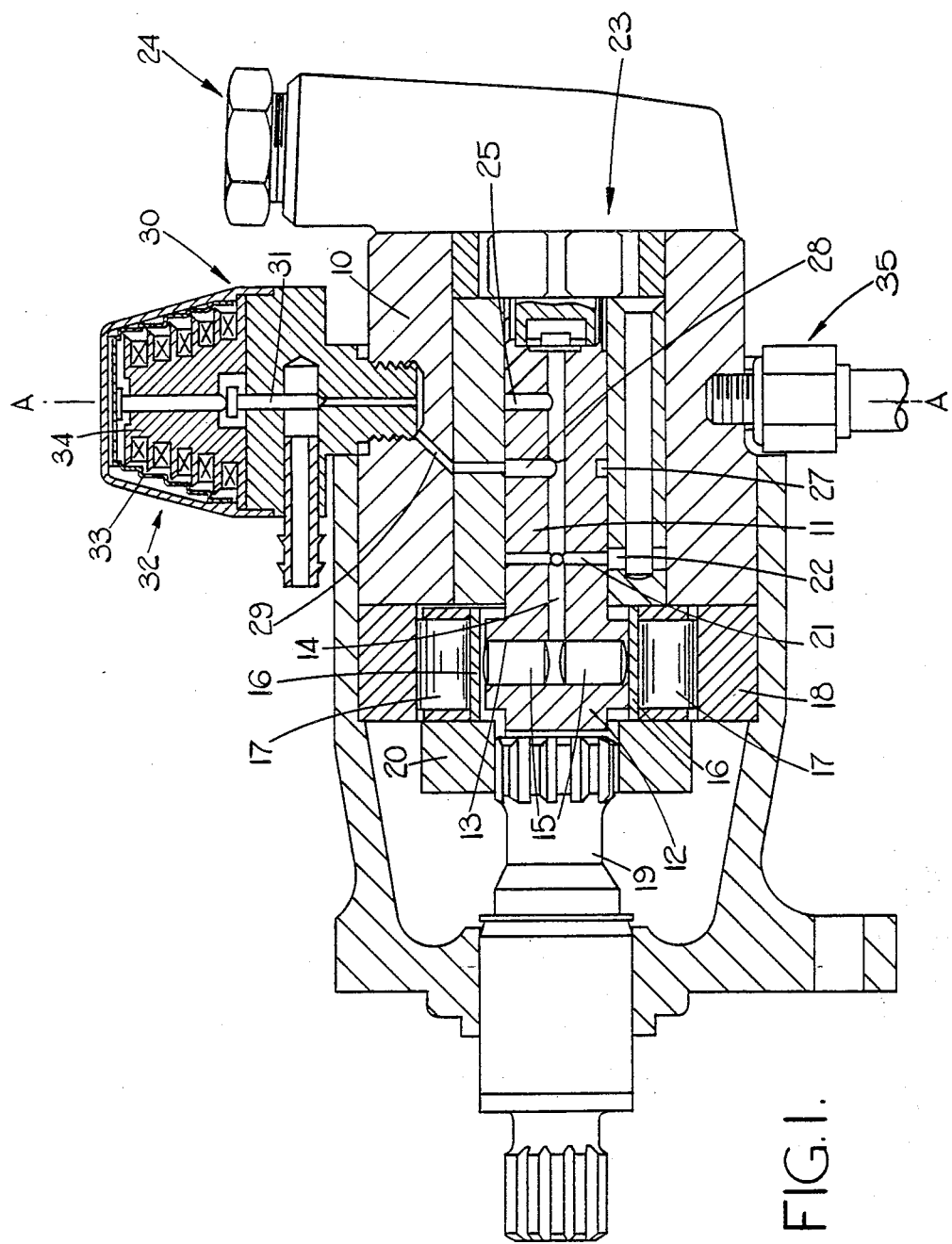
FIG. 1 is a sectional side elevation of one example of the apparatus with parts thereof re-positioned for the sake of clarity.
Figure 2:
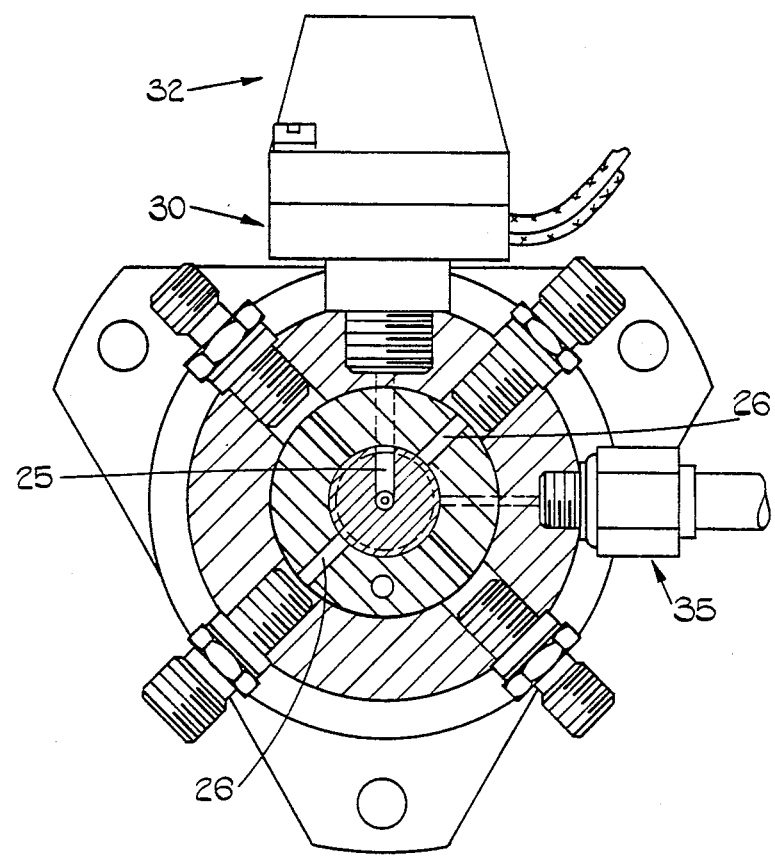
FIG. 2 is a section on the line A—A of FIG. 1.

Referring to FIGS. 1 and 2, the apparatus comprises a body 10 in which is mounted a rotary cylindrical distributor member 11. The member 11 has an enlarged portion 12 in which is formed a transversely extending bore 13 which is in communication with a longitudinal passage 14 formed in the distributor member. Located in the bore is a pair of pumping plungers 15 which at their outer ends, engage shoes 16 which support rollers 17 which engage the internal peripheral surface of an annular cam ring 18. The distributor member 11 is coupled to a drive shaft 19 which extends to the exterior of the apparatus and which in use, is coupled to a rotary part of the associated engine. The drive shaft is coupled to a sleeve 20 which is provided with a pair of slots in which are located the shoes respectively whereby when the shaft 19 is driven, the rollers and shoes are driven from the sleeve and the distributor member is driven directly from the drive shaft.

The passage 14 communicates with a plurality of radially disposed inlet passages 21 which are formed in the distributor member and which can register in turn with an inlet port 22 which is connected to the outlet of a low pressure feed pump generally indicated at 23. The feed pump has an inlet which is connected to a fuel inlet 24 of the apparatus, and a relief valve interconnects the inlet and outlet of the pump 23 so that its pressure is controlled.

The passage 14 also communicates with a delivery passage 25 and this can register in turn with outlet ports 26 which in use, are connected to the injection nozzles respectively of the associated engine. In the particular example four outlets are provided and there are also four inlet passages 21. In addition the cam ring 18 has four equi-angularly spaced inwardly directed cam lobes so positioned that inward movement is imparted to the plungers whilst the delivery passage 25 is in register with an outlet 26. The port 22 and passages 21 are positioned so that fuel can flow to the bore 13 to effect outward movement of the plungers 15 when the rollers have moved over the crests of the cam lobes.

Formed on the periphery of the distributor member is a circumferential groove 27 and this is in communication with the passage 14 by way of a radial drilling 28. Moreover, the groove 27 is in constant communication with a passage 29 which communicates with a drain and in this passage is located a control valve 30. The valve includes a valve member 31 which is urged onto a seating thereby to prevent flow of fuel through the passage 29 by means of an electromagnetic device indicated at 32 and which includes a stepped armature 33 located about a stepped stator 34 which is provided with grooves which accommodate electrical windings.

In addition, the groove 27 communicates with a pressure transducer generally indicated at 35. The pressure transducer provides an electrical signal indicative of the pressure within the bore 13 particularly during the time when the valve member 31 is closed upon the seating.

In operation, the amount of fuel which is delivered to each outlet in turn during successive inward movements of the plungers 15, is determined by operating the valve 30. When the plungers 15 are moved inwardly then if the valve 30 is open no fuel will flow to the outlets. This is because the fuel injection nozzles contain spring loaded valves which require a substantial pressure to be developed before they are lifted to permit fuel flow to the engine. Moreover, it is possible for each outlet of the pump to incorporate a delivery valve.

If, however, the valve 30 is closed while the plungers are being moved inwardly, then fuel will be delivered to the outlet which is in communication with the delivery passage 25. The amount of fuel delivered to the engine is therefore dependent upon the time measured in terms of degrees of rotation of the distributor member, during which the valve is closed. The timing of delivery of fuel can be varied by altering the time again measured in terms of degrees of rotation, at which the valve is closed whilst the plungers are moved inwardly and for a given quantity of fuel, then it may be necessary to open the valve before the inward movement of the plungers has ceased if for example the valve is closed early to advance the timing of injection of fuel.

It is well known in fuel systems for engines that the amount of fuel flowing through the injection nozzles of a fuel system may not be the same even though the operating parameters of the pumping apparatus remain the same. Thus in the system described above even though the valve 30 is closed for the same period during each cycle of operation, the quantity of fuel which is delivered through the injection nozzles may differ. This is thought to be due to various factors for example, slight differences in the settings of the spring loaded valves in the injection nozzles. It is of course desirable that each cylinder of the engine should receive the same amount of fuel and the control system now to be described attempts to ensure that this is the case.

Figure 3:
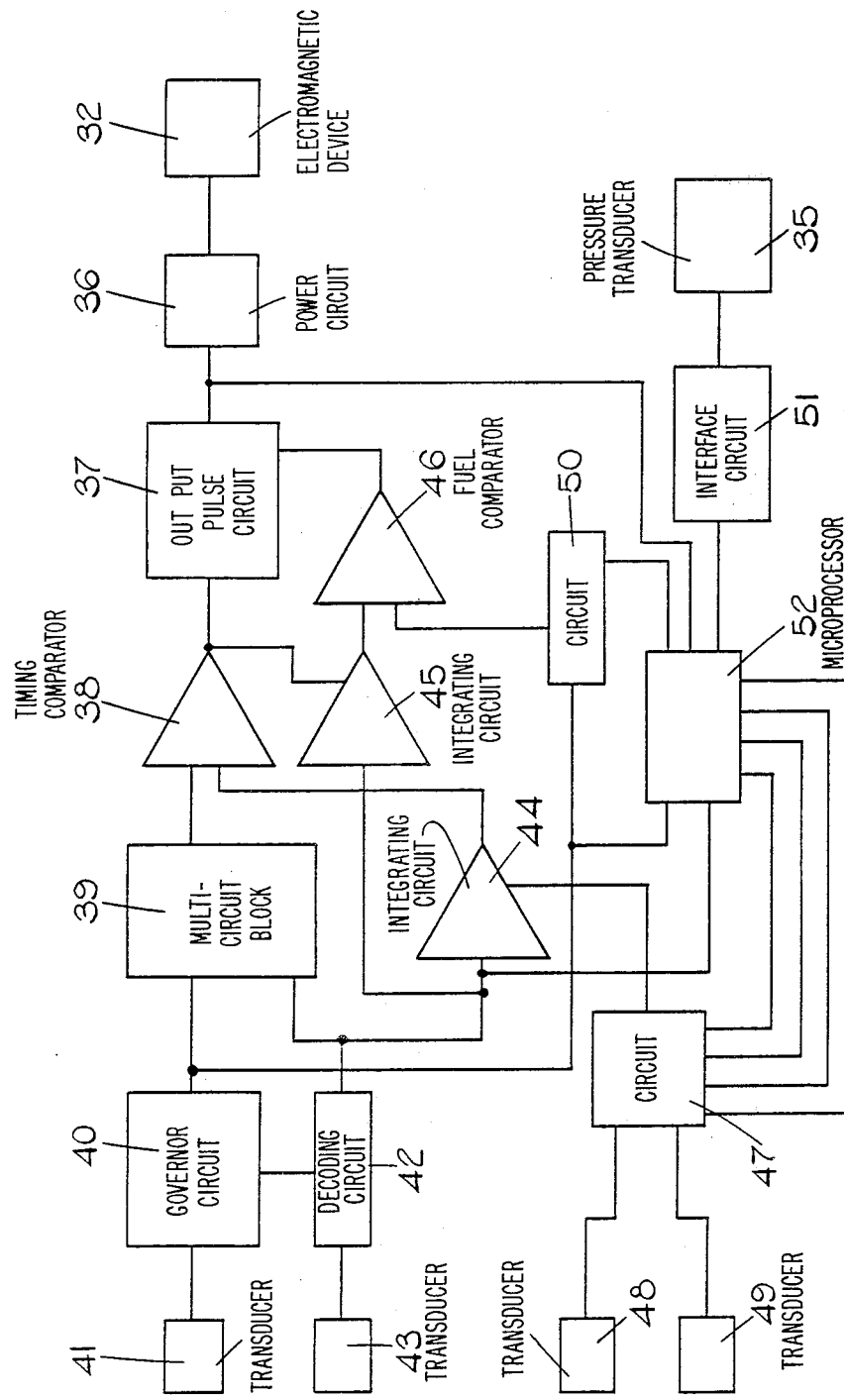
FIG. 3 is a block diagram of a control system of the apparatus.

With reference to FIG. 3 the electromagnetic device is seen at 32 and the pressure transducer at 35. The device 32 is supplied with power at the appropriate time by means of a power circuit indicated at 36 and this receives a control signal to energize the device from an output pulse circuit 37. The circuit 37 is supplied with two signals one of which causes energization of the device to initiate the supply of fuel and the other of which causes de-energization of the device and therefore cessation of fuel flow.

The first of the aforesaid signals is supplied by a so-called timing comparator 38 which receives a first signal from a multi-circuit block 39. The latter on the basis of desired fuel quantity and speed signals supplied to it, decides at what point in the engine cycle fuel should be supplied. The comparator 38 also receives an engine position signal so that the signal to cause energization of the device 32 occurs at the correct time in the engine cycle.

The desired fuel quantity signal is generated by a governor circuit 40 which receives a demand signal from a transducer 41 associated with for example, the throttle pedal of the vehicle of which the associated engine forms part. The governor circuit is also supplied with an engine speed signal from a decoding circuit 42 which in turn receives a signal from a transducer 43 the output signal of which is representative of the engine speed. From the demand signal and the speed signal the governor circuit determines the desired fuel quantity. The governor circuit also acts to control the maximum speed of the engine and may also vary the maximum amount of fuel which can be supplied to the engine in accordance with engine speed and various other engine operating parameters for example temperature and air pressure. A more complete description of the governor circuit will be found towards the end of the Specification in relation to FIG. 9.

The speed signal supplied by the decoding circuit 42 is also supplied to a pair of integrating circuits 44,45 and the first of these provides the engine position signal to the timing comparator 38. The output of the second integrator 45 is supplied to one input of a so-called fuel comparator 46 the output of which constitutes the aforesaid second signal to the output pulse circuit 37.

A control signal is supplied to the integrator 44 from a circuit 47 which receives signals from a pair of transducers 48,49. The first of these provides for each revolution of the engine, a number of signals equal to the number of engine cylinders. The second of the transducers i.e. that which is referenced 49 provides a signal once every two revolutions of the engine. From these signals the block 47 provides two sets of output signals. The first set appears at a single output and is supplied to the integrating circuit 44. The integrating circuit provides in effect an engine position signal and this is compared with the desired timing signal by the comparator 38 so that delivery of fuel starts to take place at the required time in the engine cycle. The signal provided by the block 47 to the integrating circuit 44 is a multipulse signal for the purpose of ensuring that fuel delivery takes place at the correct time for all the engine cylinders.

Delivery of fuel is terminated as previously described by a signal from the fuel comparator 46. For this purpose the comparator receives a fuel quantity signal from a circuit 50 to which is supplied the desired fuel signal from the governor circuit. The circuit 50 has another function which will be described. The comparator 46 also receives a signal from the integrating circuit 45 which in fact is a time signal but by virtue of the fact that the slopes of the leading flanks of the cam lobes on the cam ring 18 are constant throughout their length, is also representative of fuel quantity. The integrating circuit starts to operate as soon as the device 32 is energised and as soon as the comparator 46 indicates that the required amount of fuel should have been supplied, the comparator output signal effects de-energization of the device 32.

As described while the device 32 will be energised for the same time considered in terms of degrees of rotation of the distributor member, due to the different settings of the injection nozzles it is likely that unequal volumes of fuel will be delivered to the engine cylinder.

It is found that if a number of injection nozzles having differing nozzle opening pressures are supplied by the same injection pump in turn the pump being operated for the same period of time, then the nozzle which has the lower or lowest opening pressure will discharge most fuel to its associated engine cylinder. The pressure attained during the delivery of fuel is sensed by the pressure transducer 35 and hence each time delivery of fuel takes place a pressure signal will be obtained. It is assumed that the correct nozzle of a group is the one which exhibits the lowest rate of pressure rise, the rate of pressure rise being defined by the peak pressure divided by the injection period. This is because the nozzle peak pressure tends to increase in use due to blockage of the orifices. The rate of pressure rise relative to this nozzle is stored and the values for the other nozzles are compared with it. The difference is utilized to extend in the case of the other nozzles, the time in terms of degrees of rotation of the distributor, during which the device 32 is energized. In this manner the outputs of each nozzle are equalized.

As shown in FIG. 3 the transducer 35 supplies a signal by way of an interface circuit 51 to a microprocessor 52. The processor 52 receives signals from the circuit 47 the signals in this case relative to the individual cylinders being supplied along separate lines. Also supplied to the processor is a signal from the pulse circuit 37. The processor from the signals supplied by the circuits 37 and 51, calculates for each injection nozzle the rate of pressure rise. The processor selects the lowest signal and notes for which injection nozzle this occurs. For this nozzle the circuit makes no modification of the signal supplied to the comparator 46 from the govenor circuit 40. In the case of the other nozzles the rate of pressure rise signals are higher and the differences between these signals and the lowest signal or reference signal is utilized to modify the signal supplied to the comparator 46. This is achieved by referring to information stored in the processor regarding the adjustment required. The actual adjustment will depend upon speed and the required injection period this being obtained from the output of the governor circuit 40. Circuit 50 is an adder circuit and the effect is to increase the value of the signal supplied to the comparator and this has the effect of increasing slightly the time during which the device 32 is energized so that each injection nozzle discharges the same amount of fuel.

Figure 4:
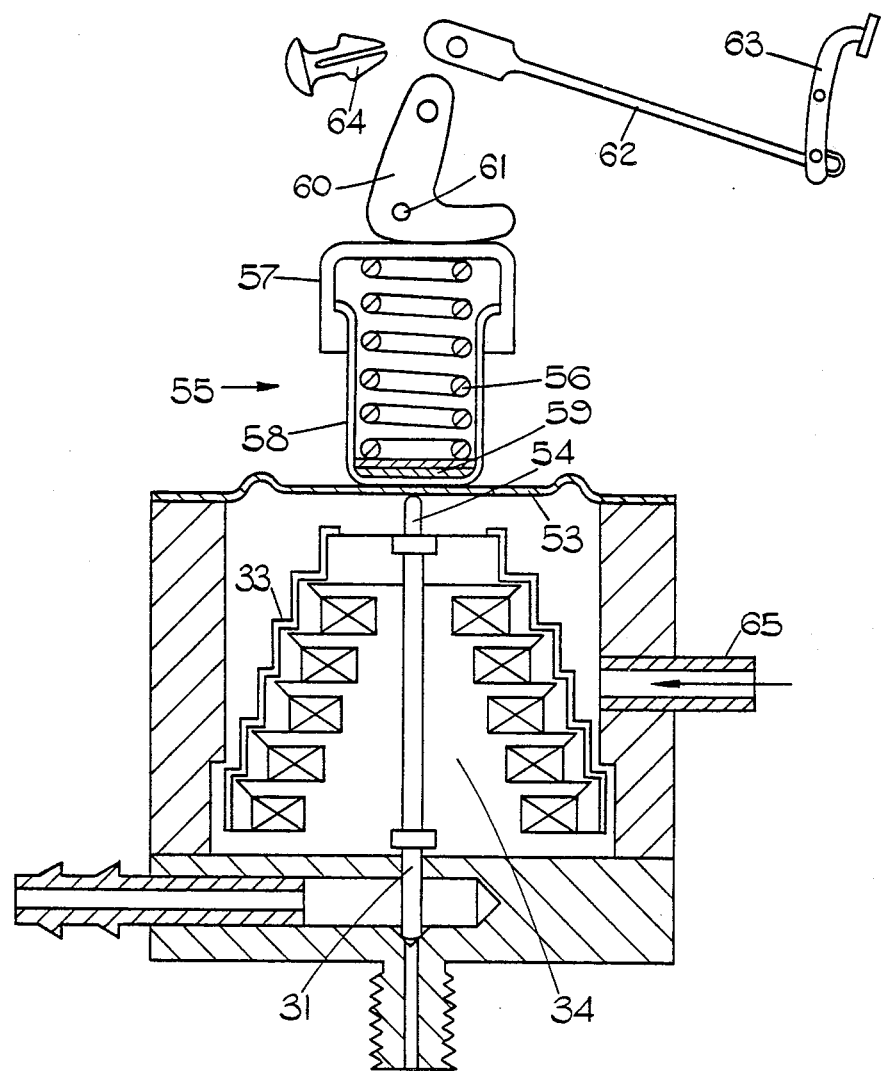
FIG. 4 shows in diagrammatic form a modification of part of the apparatus seen in FIG. 1.
Figure 5:
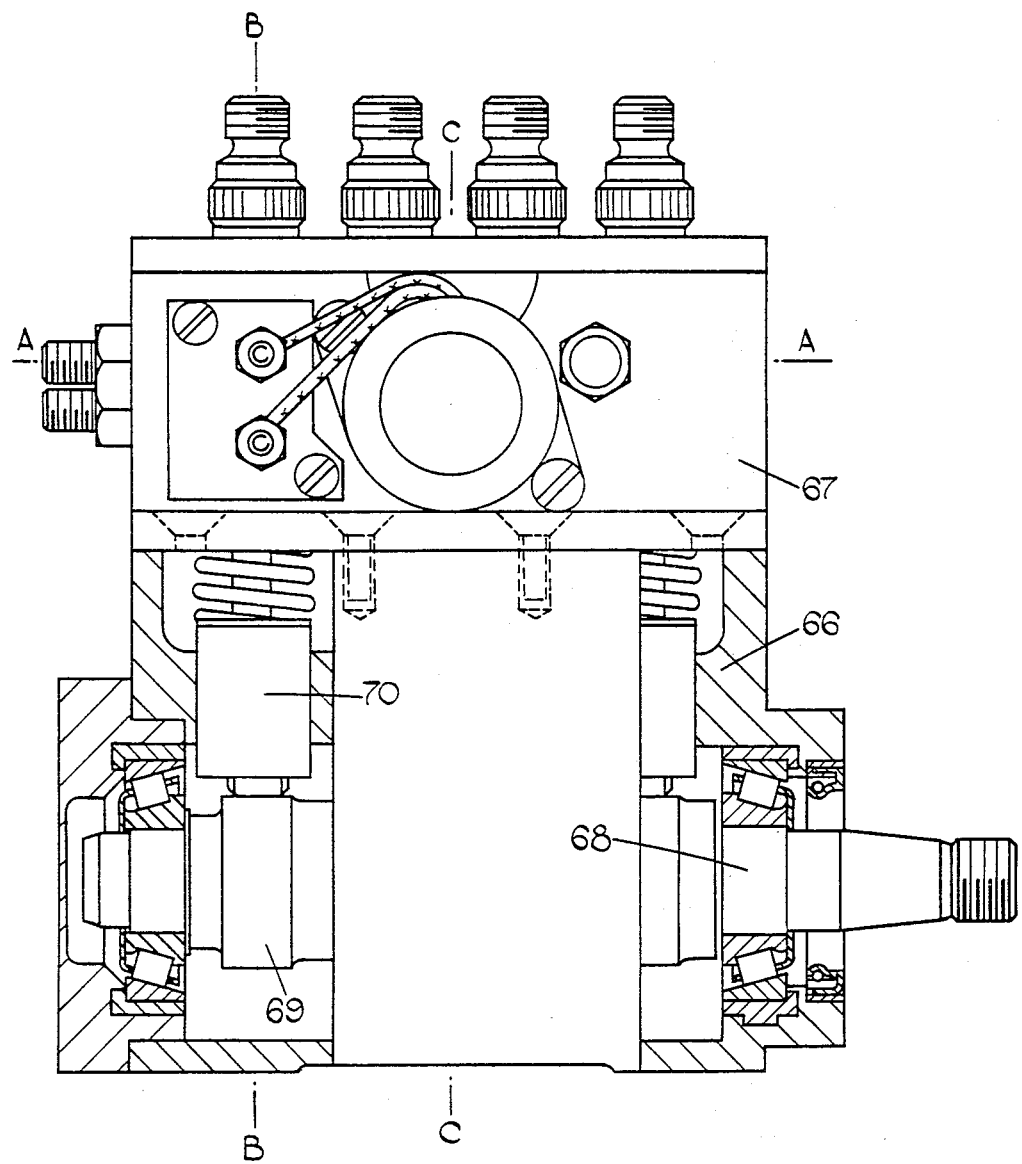
FIG. 5 shows in a part sectional side view another example of a fuel pumping apparatus in accordance with the invention.
Figure 8:
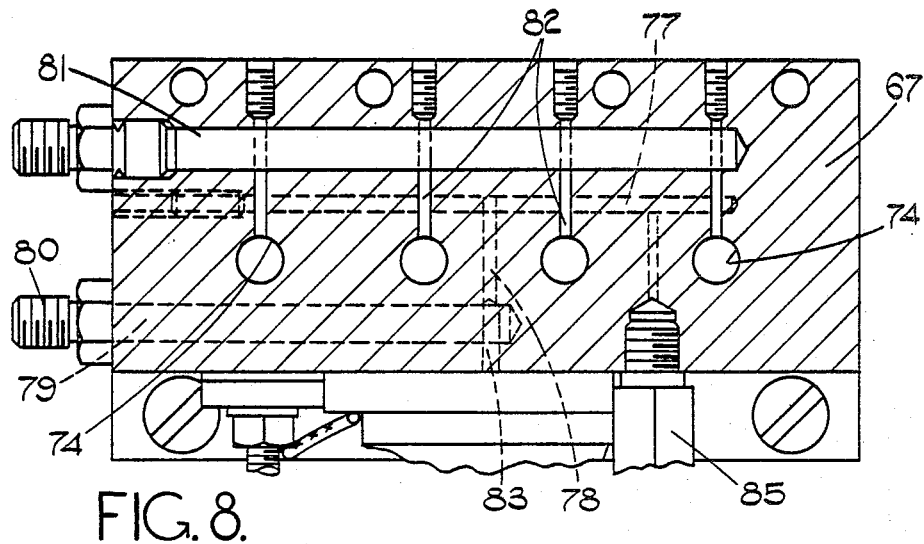
FIG. 8 shows a part sectional plan view of the apparatus seen in FIG. 5.

It is convenient to provide as an emergency measure, a means whereby fuel can continue to be supplied to the associated engine even if there is a failure in the control system. For this purpose, and as shown diagrammatically in FIG. 4, the construction of the device 32 is modified by forming the cover of the device with a flexible wall which is referenced 53. The armature is provided with a projection 54 engageable with this wall. Moreover, a spring pack 55 is provided which essentially comprises a preloaded coiled compression spring 56 enclosed within a pair of relatively movable generally cup-shaped housing parts 57, 58. The preload of the spring 56 can be adjusted during manufacture by means of shims 59 disposed between one end of the spring and the adjacent housing part.

Housing part 58 can be engaged with a wall 53 while the housing part 57 is engageable by a cam 60 pivotally mounted about an axis indicated at 61. The cam is an emergency, can be connected by means of a link 62 to the throttle pedal indicated at 63 of the vehicle, a stud 64 being provided for this purpose. For normal running when the control system is functioning correctly, the spring pack exerts little or no force upon the wall 53 and the operation of the device is as described. In the event of failure of the control system however, the latter is fully disabled by disconnecting it from the source of electric supply, and the link 62 connected to the cam 60. Depression of the throttle pedal will move the valve member 31 to the closed position but as the pressure within the various passages within the pump increases during a delivery stroke, a point will be reached at which the force acting on the valve member due to the fuel pressure, will lift the valve member from its seating against the action of the spring 56. As a result, no further fuel will be delivered to the associated engine. If the force exerted by the spring 56 is increased by further depression of the throttle pedal, it can be expected that an increased amount of fuel will be delivered to the associated engine since the pressure required to lift the valve member 31 will increase.

In order to provide for control of the maximum engine speed during emergency operation, the interior of the cover of the device is connected by way of a pipe 65 to the outlet of the low pressure feed pump (FIG. 1). The output pressure of this pump increases with speed and hence the force produced by the pressure acting on the wall 53 will increase as the speed increases and will of course act in opposition to the spring 56. Thus for a given setting of the throttle pedal the fuel flow to the engine will decrease as the speed increases.

In FIGS. 5—8 inclusive, there is shown another form of pump having a pump body which includes a hollow lower part 66 and an upper part 67. Journalled within the lower part of the body is a cam shaft 68 which in use, is driven in timed relationship with an associated engine. The cam shaft mounts four spaced cams 69 the cams being of a wide angle constant rate type.

Associated with each cam is a tappet assembly 70 and this includes a roller 71 which engages the cam. The followers have coiled compression springs 72 associated therewith, the action of the springs being to urge the rollers into contact with the cams.

Associated with each follower is a pumping plunger 73, the plungers being mounted within bores 74 formed in the upper part 67 of the body. The upper ends of the bores are closed by outlets 75 which in use are connected to the respective injection nozzles of the associated engine and each outlet includes as is well known, a non-return delivery valve of the unloading type.

Extending into the bores 74 is a first series of ports 76 and each of these ports communicates with a drilling 77. The drilling 77 by means of a single passage 78 communicates with a spill gallery 79 having an outlet 80 through which in use, fuel spilled as will be described, can be returned to a fuel tank. Fuel is supplied from the tank, by means of a pump not shown, to an inlet gallery 81 and extending from the gallery 81 is a second series of ports 82 which communicate with the bores 74 respectively at a position closer to the outlets 75 than the first series of ports 76.

Formed in each plunger at a position spaced from the end thereof remote from the cam is an elongated circumferential groove 83 and this by way of a drilling in the plunger, communicates with the end surface of the plunger remote of the cam.

Starting from the position of the plunger seen in FIG. 7, it will be observed that the port 82 is uncovered to the portion of the bore lying between the end of the plunger and the outlet. The aforesaid portion of the bore is therefore completely full of fuel, the fuel having been supplied under pressure from the inlet gallery 81. Moreover, it will be noted that the port 76 is covered, the plunger being in its lower most position. As the cam rotates in the clockwise direction as seen in FIG. 7, inward or upward movement will be imparted to the plunger and the end of the plunger will start to cover the port 82 and substantially at the same time, the port 76 will be uncovered to the circumferential groove 83. The upward movement of the plunger will displace surplus fuel from the bore through the port 82 but as soon as the port 82 is covered and providing as will be explained, a valve associated with the passage 78 and the spill gallery 79 is closed, fuel will be delivered through the associated outlet 75 to the respective injection nozzle. The flow of fuel will continue until the upward movement of the plunger ceases and as the roller goes over the crest of the cam, the plunger will be moved downwardly by the action of the spring 72.

During the initial downward movement, the delivery valve in the outlet 75 will close onto its seating, after allowing a predetermined volume of fuel to flow back into the bore from the pipe line connecting the outlet to the nozzle. When the port 82 is uncovered fuel will flow into the bore and as the plunger continues to move downwardly the port 76 will again be covered by the plunger. As the cam shaft continues to rotate another plunger will start to partake of inward movement and the sequence of events as described above will take place. Fuel is therefore supplied to the injection nozzles of the engine in turn.

In order to control the amount of fuel which is supplied at each inward stroke of a plunger, a valve 83 is provided and which is maintained in a closed condition by means of an electro-magnetic actuator 84. The valve 83 includes a valve member which can co-operate with a seating defined at the junction of the passage 78 with the spill gallery. If the valve is opened while inward movement of a plunger is taking place then the fuel will flow through the respective port 76 during the inward movement of the plunger, rather than through an outlet 75. If during the inward movement of the plunger, the valve is closed then the fuel will be forced to flow through the outlet 75. Hence by controlling the operation of the valve the amount of fuel which is supplied to the associated engine each time a plunger is moved inwardly, can be controlled. As mentioned the cams 69 are of the constant rate type so that the timing of delivery of fuel can also be varied without having a significant effect upon the rate of fuel delivery to the engine.

It is important with the embodiment described to ensure that when one port 76 is uncovered to the respective circumferential groove 83, the other ports 76 should be closed. If this were not the case then the fuel could spill through the uncovered ones of those other ports and no fuel would be delivered to the associated engine. An adequate time is available with a pump for supplying fuel to a four cylinder engine to ensure that only one port 76 is open to its associated circumferential groove 83. If the engine to which fuel is supplied has more than four cylinders for example eight cylinders, it may be convenient to provide two spill galleries 81 and two of the aforesaid valves together with the associated actuators. On the other hand, it is possible to incorporate non-return valves in the ports 76 to ensure that fuel can only flow from the ports 76 into the drilling 77 and not in the other direction.

The control circuit for controlling the actuator can be the same as that described earlier in the specification and since this receives signals from a pressure transducer, such a transducer is indicated at 85 and is connected by a short drilling to the passage 77.

Figure 9:
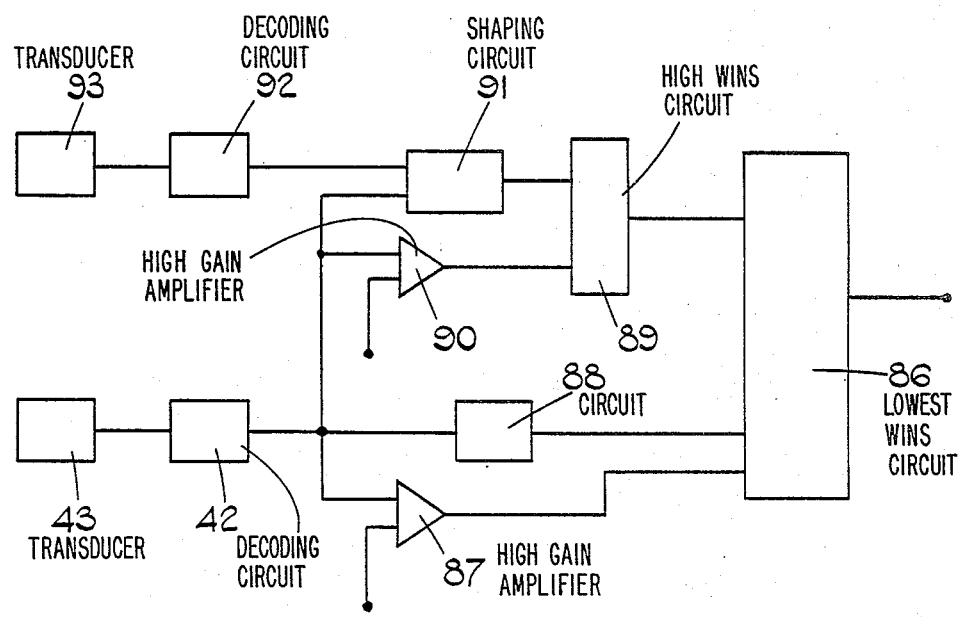
FIG. 9 shows in block form, the component parts of one of the blocks of the block diagram of FIG. 3.

Reference will now be made to FIG. 9 which shows the governor circuit for providing the demanded fuel signal to the comparator 39 and the circuit 50. The circuit of FIG. 9 provides a two speed governing effect and includes a lowest wins circuit 86 the output of which constitutes the fuel demand signal. The circuit 86 has three inputs the lowest of which is selected by the circuit for supply as the fuel demand signal.

One input of the circuit 86 is connected to the output of a high gain amplifier 87 provided with feedback. One input of the amplifier is provided with a reference signal representative of the maximum allowed engine speed whilst the other input is supplied with the actual engine speed signal from a decoding circuit shown as the decoding circuit 42 of FIG. 3.

The second input of the circuit 86 is connected to a circuit 88 which also receives the speed signals and provides a signal representing the maximum fuel signal throughout the speed range of the engine.

The third input of the circuit 86 is connected to the output of a high wins circuit 89 which has two inputs. The first input is connected to the output of a high gain amplifier 90 provided with feedback and having two inputs one of which receives a reference signal representing the desired engine idling speed and the other of which receives the engine speed signal. The second input of the circuit 89 is connected to the output of a shaping circuit 91 which receives the engine speed signal and also a signal from a decoding circuit 92 which in turn receives a signal from a transducer 93 associated with an engine operator adjustable control e.g. the throttle pedal in the case of a road vehicle.

In operation at engine idling speeds the amplifier 90 is operative to determine the demanded fuel signal at the output of the circuit 86 since with no demand on the part of the operator, the output from the amplifier will be larger than the output from the shaping circuit 91 but smaller than the output of the circuit 88 and the amplifier 87. When the operator places a demand on the engine by depressing the throttle pedal, then the output of the shaping circuit becomes higher than the output of the amplifier. If only a small demand is made then the signal from the circuit 89 will still be lower than those provided by the circuit 88 and the amplifier 87. Hence the driver will control directly the amount of fuel supplied to the engine and with an increased flow of fuel the engine will accelerate. If the operator makes a large demand on the engine then it is likely that the output of the circuit 89 will be greater than the output of the circuit 88 in which case the rate of fuel supply will be controlled by the circuit 88 until the output of the circuit 89 becomes smaller thereby restoring the control of the fuel supply to the operator. If the maximum allowed engine speed is attained then the output of the amplifier 87 becomes less and the fuel supply to the engine will be reduced to control the speed of the engine. The shaping circuit 91 is arranged to modify the apparent demanded fuel in accordance with increases in the engine speed to provide feedback to the operator of the engine. Furthermore, the idling speed may be modified in accordance with variation in low fuel demand on the part of the operator. This provides a smooth transition from the control by the amplifier 90 to the control by the circuit 91 and eliminates "lost motion" in the operator adjustable control.

The governor circuit may be modified in many ways to provide for example, a change in the idling speed with engine temperature, modification of the maximum fuel delivery in accordance with the ambient air pressure and or temperature, modification of the maximum fuel delivery with the pressure in the air inlet manifold of the engine, additional fuel for starting the engine when cold and modification of the fuel level for starting when the engine is hot.

FIG. 9 shows a two speed governor arrangement for providing the fuel demand signal. It will be understood that the circuit of FIG. 9 may be replaced by an all speed governor circuit or an isochronous governor circuit.

It is advantageous for some engines to deliver an initial volume of fuel to the engine in advance of the main volume of fuel. This can be achieved by closing the spill valve for a short period and then re-opening the valve to allow spill and then re-closing the valve to cause the main volume of fuel to be delivered.

If the valve is opened and closed rapidly a number of times before it is held closed to obtain full delivery of fuel the effect is obtained of a reduced rate of fuel delivery to the engine, a feature which is useful for some types of engine.

We claim:

1. A liquid fuel injection pumping apparatus for supplying fuel to the injection nozzles in turn of a multi-cylinder compression ignition engine, comprising a plurality of outlets for connection in use to the fuel injection nozzles respectively, means for delivery of fuel to the outlets in turn, a spill passage which in use is connected to the outlets in turn when said outlets are supplied with fuel, an electrically controlled valve in said spill passage, said valve when open diverting fuel from the outlet with which it is connected, electrical circuit means for controlling the operation of said valve, a pressure transducer responsive to the pressure upstream of said valve, said pressure transducer supplying signals to said circuit means indicative of the fuel pressures attained during delivery of fuel through the outlets, said circuit means including means responsive to said signals for adjusting the periods during which the valve is closed and having a microprocessor which selects from said signals the one representative of the outlet at which the lower or lowest rate of pressure rise is achieved, and compares said one signal with the remaining signals to produce correction signals which are utilized to prolong the closure of the valve and to extend the time fuel is supplied by the apparatus to those outlets with which the other signals pertain.

2. A liquid fuel injection pumping apparatus for supplying fuel to the injection nozzles in turn of a multi-cylinder compression ignition engine, comprising a plurality of outlets for connection in use to the fuel injection nozzles respectively, means for delivery of fuel to the outlets in turn, a spill passage which in use is connected to the outlets in turn when said outlets are supplied with fuel, an electrically controlled valve in said spill passage, said valve when open diverting fuel from the outlet with which it is connected, electrical circuit means for controlling the operation of said valve, a pressure transducer responsive to the pressure upstream of said valve, said pressure transducer supplying signals to said circuit means indicative of the fuel pressures attained during delivery of fuel through the outlets, said circuit means including means responsive to said signals for adjusting the periods during which the valve is closed, and said valve including a valve member subjected to the pressure of fuel in said spill passage and which is movable by said fuel pressure to open the valve, resilient means biasing said valve member in opposition to the force exerted by the fuel under pressure and means operable to provide manual adjustment of the force exerted by the resilient means in the event of failure of said circuit means, whereby the apparatus can continue to supply fuel to the associated engine.

3. An apparatus according to claim 1, in which said microprocessor calculates for each outlet the rate of pressure rise during the period fuel is supplied to that outlet.

4. An apparatus according to claim 3, in which said microprocessor includes a memory in which is stored information relative to the extent of correction required for different values of speed and fuel demand.

5. An apparatus according to claim 2, including a member defining a surface against which low pressure fuel can act to oppose the action of said resilient means, and a low pressure pump for supplying said low pressure fuel.

* * * * *